es Patent Office 3,755,542
Patented Aug. 28, 1973

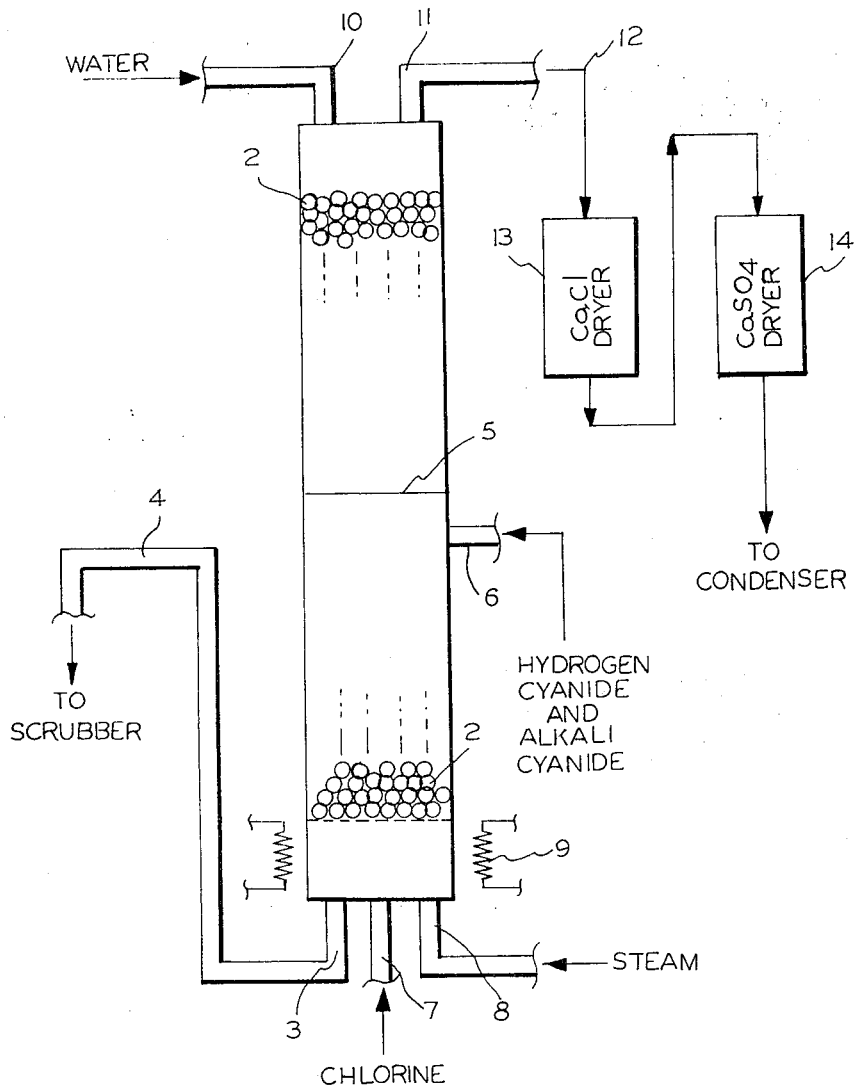

3,755,542
PROCESS FOR THE CONTINUOUS PRODUCTION
OF CHLORINE-FREE CYANOGEN CHLORIDE
Yelagondahally S. Suryanarayana, Mobile, Ala., assignor
to Ciba-Geigy Corporation, Greenburgh, N.Y.
Filed Aug. 20, 1970, Ser. No. 65,457
Int. Cl. C01b 21/52, 31/00
U.S. Cl. 423—364
5 Claims

ABSTRACT OF THE DISCLOSURE

Cyanogen chloride without detectable chlorine and containing up to 1% of free hydrogen cyanide can be prepared by reaction of chlorine with acidified alkali cyanide or hydrogen cyanide solution in amounts up to 40% excess cyanide over the theoretical amount. The reaction is performed in an apparatus providing an efficient gas-liquid contact as e.g. in a flooded packed column or a sparged gas reactor, to have a quantitative reaction of the chlorine. The reactor liquid effluent is maintained in boiling conditions to minimize its cyanide content.

---

This invention relates to a method for the production of cyanogen chloride and more particularly it relates to the production of cyanogen chloride essentially free of chlorine in a one-column closed system providing means for an intimate gas-liquid contact.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

To obtain a high yield conversion of chlorine and hydrogen cyanide into cyanogen chloride and at the same time reducing the amount of unreacted hydrogen cyanide in the final product, in presently used commercial processes usually an excess of chlorine has to be used. This method produced a cyanogen chloride containing large amounts of chlorine. For many uses, however, it is highly desirable that the cyanogen chloride employed has a high degree of purity. This is especially true with respect to the chlorine as by-product, because already a slight excess thereof gives rise to serious stability and corrosion problems in storage. In practice, however, it was heretofore not possible to obtain such a chlorine free product directly on occasion of its synthesis and separate purification steps were therefore necessary, as e.g. hazardous distillation of liquid cyanogen chloride to remove the dissolved chlorine or purification of the cyanogen chloride gas by passing it through special absorption solutions whose active purification reagents had to be replaced periodically on exhaustion. A process for purification of cyanogen chloride using this latter principle is described in U.S. Pat. 3,266,182, in the name of Joseph Francis Martino.

The present invention relates to a process which overcomes the disadvantages inherent in prior art procedures in providing a simple, continuous, economically feasible method of obtaining in one step cyanogen chloride which is essentially free of chlorine. The process according to the invention utilizes a closed system, i.e. a column providing means for an intimate gas-liquid contact and comprises reacting in an acid liquid reaction medium gaseous chlorine with from a stoichiometric amount up to a 40% excess of hydrogen cyanide or an acidified alkali cyanide solution, preferably in amounts in excess of 5 to 12% over stoichiometric amounts, and recovering cyanogen chloride from said liquid reaction medium, the temperature in said column decreasing from 95°–110° C. at the bottom to 13–25° C. at the top.

A preferred embodiment of the invention will be described in connection with the accompanying schematic drawing.

The device in which the method of the invention is carried out comprises a reaction column 1 which is packed with saddles or rings 2 an has an outlet 3 at the bottom designed in such a manner as to provide (e.g. by means of an overflow line 4 a constant liquid level 5 at about half of the total height of the column packing. An inlet for the hydrogen cyanide and alkali cyanide solution respectively 6 is provided just below the constant liquid level maintained in the column by the overflow line 4. At the bottom of the column in the chlorine inlet 7 and a steam inlet 8 which is supplemented or may be fully replaced by an electrical heating device 9. The top of the column is equipped with a water inlet 10 and a gas outlet 11 through which water is fed into the column and gas produced within the reactor is taken out of the reaction column respectively. In actual practice a conduit 12 extends from the primary product outlet 11 to a calcium chloride 13 and calcium sulfate dryer 14 and thence to a condensing system (not shown) in which the gaseous dry cyanogen chloride may be liquified.

In operating the apparatus to carry out the method, the column is kept flooded up to the chosen constant level 5, or above by feeding to it at the top water which flows downwardly and thereby absorbs in the upper column section free hydrogen cyanide and removes any free chlorine by reaction. The temperature of the water fed into the top of the column should be between 13–25° C., and preferably 15–20° C. The reason for maintaining the water at such a temperature is that below 13° C., liquid cyanogen chloride may form in the top of the column. The bottom of the column is heated electrically or by steam, which is introduced into the column bottom, to a temperature of from 95–110° C., preferably 102–105° C., as to maintain the reactor liquid effluent in a boiling condition. By that the cyanide content of the liquid effluent can be minimized to 100–500 p.p.m. by weight and no cyanogen chloride remains dissolved in the liquid leaving the column. Any cyanide which should nonetheless be left in the bottom effluent may be destroyed in a scrubber by treating it with chlorine and neutralizing the resulting liquid with sodium hydroxide before discharging it into a toxic sewer. The cyanide necessary for the reaction may be provided as liquid or gaseous hydrogen cyanide or as an acidified aqueous alkali cyanide solution, preferably sodium cyanide solution, whose alkali cyanide concentration is preferably between 5–20% (by weight) and whose pH is between 4 and 6 and preferably between 5 and 6; or the alkali cyanide solution can be fed into the column in one line and in a parallel second line an aqueous, about 2 N acid solution is introduced. Preferred as acids are sulfuric acid and especially hydrochloric acid.

The cyanide used is present in a stoichiometric amount or in an amount which is up to 40%, preferably of from 5 to 12% in excess over that stoichiometrically required to convert all the chlorine to cyanogen chloride, and is fed into the flooded part of the column. From the bottom of the column gaseous chlorine is fed into the column. The rates of cyanide, chlorine and water flows are regulated by appropriate rotameters. Thereby the rate of feed of the cyanide flow is adjusted and then uniformly maintained to obtain a 0.1–1% excess of hydrogen cyanide in the overhead gas. This overhead gas which consists of cyanogen chloride essentially free of chlorine and containing 0.1–1% of hydrogen cyanide is dried by passing through a $CaCl_2$ and $CaSO_4$ dryer and may then be disposed of directly or condensed to liquid cyanogen chloride if desired. The actual amounts of the starting materials cyanide and chlorine and the amount of water fed to the reaction column will depend mainly on the size of the apparatus.

The liquid aqueous reaction medium which is represented by the flooded part of the column, has a pH below 6 and contains, besides the acid, preferably up to 10% hydrochloric acid, dissolved cyanide ion, hydrogen cyanide, chlorine and cyanogen chloride of which the last three mentioned compounds also in gaseous form.

The temperature conditions in the reaction column are controlled by having fixed bottom and top temperatures. By maintaining these two temperature limits one obtains along the column a temperature gradient continuously decreasing from 95–110° C. at the bottom to 13–25° C. on top. Maintenance of such temperatures is a factor in obtaining high yields of cyanogen chloride by reducing the hydrolysis of HCN and CNCl as well as loss of HCN in the aqueous solution leaving the column.

In prior art procedures high excess of chlorine was used to assure completion of the desired reaction. As a consequence the resulting cyanogen chloride contained large amounts of chlorine as by-product which had to be removed in a specific purification step if pure CNCl was to be obtained. It is surprising and unexpected that according to the present invention by using no excess of chlorine but instead an equivalent amount or an excess of cyanide the reaction between chlorine and cyanide to give cyanogen chloride goes nonetheless to completion giving therefore practically quantitative yields of conversion together with only very small percentages of HCN admixed to the substantially chlorine free CNCl. This must be attributed to the insurance of a thorough gas-liquid contact leading to a complete consumption of the chlorine during the contact time. This contact may be accomplished by appropriate known means, as e.g. maintaining the packed column flooded. It is apparent that other devices of warranting such an intimate gas-liquid contact, such as a sparge gas reactor as described in U.S. Pat. 3,499,737, in the name of W. S. Durrell et al., may be used. Therefore, while the invention has been described in connection with a particular reaction column, it is not intended that it be limited to such a reaction column. It will be equally useful with other types of reaction apparatus in which it is possible to feed chlorine and cyanide into the liquid reaction medium and effect good gas-liquid contact at high rates of throughput and heat transfer.

It is thought that the invention and its advantages will be understood from the foregoing description and it is apparent that various changes may be made in the form, construction and arrangements of the arts without departing from the spirit and scope of the invention or sacrificing its material advantages, the form hereinbefore described and illustrated in the drawing being merely a preferred embodiment thereof.

The invention may be illustrated in greater detail by the following examples; it is, however, not limited thereto.

EXAMPLES 1–8

Water (1 gal./hr.), maintained at 13–15° C., was fed to the top of a Pyrex glass column, 7 ft. long and 2 in. ½ in. Intalox (porcelain) saddles. The bottom saddle support was 8 in. above the column bottom. This lowest 8 in. section of the column was electrically heat traced and steam was injected at the bottom to bring the column bottom to 95–100° C. The water flow was regulated with a Brooks rotameter having a rate of 0–4 gal./hr. The sodium cyanide solution, as a 5–10% by weight acidified solution, was fed to the column by a 0–100 cc./min. Fluid Metering, Inc., Model RRP-G Lab Pump.

In Example 1, a 8.0% (by weight) NaCN solution was used which was prepared as follows: 1375.0 g. of NaCN were dissolved in 4000 ml. of water and 4000 g. of ice were added. Separately 3300 ml. of a 32% (by weight) HCl were slowly added to 4000 g. of ice. This cooled acid was added to the chilled NaCN solution as to bring the pH to 4.0–5.0. The total weight of the solution was 17,195.0 g. The sodium cyanide solution was introduced at a point three feet above the bottom saddle support and 6–12 in. below the liquid level maintained in the column by an overflow line. The sodium cyanide solution flow was started at a rate of approximately 60 cc./min. The chlorine was introduced into the bottom of the column. Its flow was regulated with a Brooks rotameter (Type R–2–15–C with a 0–5000 cc./min. flow rate). The chlorine gas flow was kept at a rate of 2600 cc./min. The sodium cyanide solution flow was adjusted to obtain a steady state composition of the overhead gas of 0.1–1.0 mole percent excess HCN. The system was kept operating until after drying and condensing 15 lbs. of liquid CNCl had been obtained, i.e. during about 24 hours.

The result of this run is indicated in Table I. In a similar manner the results of Examples 2–8, given in the same Table I, were obtained.

The determinations to obtain the necessary analytical data were performed as follows:

Analysis of overhead gas

Product overhead was analyzed by vapor phase chromatography using an 8 ft. x ¼ in., 50% Arochlor 1242 on Chromosorb A.S. column. Reaction products are eluted in the following order:

air—$CO_2$—HCl—$(CN)_2$—HCN—$Cl_2$—CNCl

A 1½ cc. vapor sample is injected into a Perkin Elmer Model 154 vapor fractometer with a constant temperature of 55° C. and helium as carrier gas at 930 mm. Hg.

Analysis of column bottom and NaCN solutions

The aqueous effluent from the column reactor and sodium cyanide solutions are analyzed for $CN^\ominus$ by standard wet titration using 0.2% p-dimethylamino-benzalrhodamine indicator.

TABLE I

| Example No. | NaCN Soln. Cc./min. | pH | Weight percent CN⁻ | Input g./min. CN⁻ | Input g./min. H₂O | Input g./min. Cl₂ | Moles/min. CN⁻ | Mole percent excess CN⁻ | Overhead composition (mole percent) Cl₂ | Overhead composition (mole percent) HCN | Overhead composition (mole percent) CNCl | Mole percent chlorine converted | Column bottom, weight percent CN |
|---|---|---|---|---|---|---|---|---|---|---|---|---|---|
| 1 | 68.0 | 4.5 | 4.2 | 2.8 | 63 | 5.5 | 0.1070 | 38.6 | 0.18 | 0.11 | 99.71 | 99.71 | |
| 2 | 55.0 | 6.0 | 4.0 | 2.2 | 63 | 5.5 | 0.0855 | 10.7 | N.D. | 0.31 | 99.6 | 100.0 | |
| 3 | 65.0 | 6.0 | 4.2 | 2.7 | 63 | 5.5 | 0.102 | 32.0 | N.D. | N.D. | 100.0 | 100.0 | 0.032 |
| 4 | 65.0 | 5.5 | 4.2 | 2.7 | 63 | 5.5 | 0.102 | 32.0 | N.D. | 0.68 | 99.32 | 100.0 | |
| 5 | 54.0 | 5.5 | 3.9 | 2.1 | 63 | 5.5 | 0.0815 | 5.2 | N.D. | 0.2 | 99.8 | 100.0 | |
| 6 | 60.0 | 5.7 | 4.0 | 2.4 | 63 | 5.5 | 0.0921 | 19.2 | N.D. | 0.69 | 99.31 | 100.0 | 0.022 |
| 7 | 63.0 | 5.6 | 3.9 | 2.5 | 63 | 5.5 | 0.096 | 24.5 | N.D. | 0.93 | 99.07 | 100.0 | 0.02 |
| 8 | 63.0 | 5.2 | 3.9 | 2.4 | 63 | 5.5 | 0.0921 | 19.2 | N.D. | 0.41 | 99.59 | 100.0 | 0.023 |

Note.—N.D. means non-detectable.

What is claimed is:

1. A method for the continuous production of cyanogen chloride without detectable chlorine which comprises reacting gaseous chlorine with from a stoichiometric amount up to 40% excess of hydrogen cyanide or an acidified alkali cyanide solution in an acid liquid reaction medium in a one-column closed system providing means for an intimate gas-liquid contact and recovering cyanogen chloride without detectable chlorine from said liquid reaction medium, the temperature in said column decreasing from 95–110° C. at the bottom to 13–25° C. at the top.

2. A method as claimed in claim 1 wherein said acid reaction medium has up to about 10% hydrochloric acid therein and wherein said cyanide solution is a sodium cyanide solution of a pH of from 4–6.

3. A method as claimed in claim 1 which comprises the step of
   (a) feeding water of a temperature of from 13–25° C. to the top of said column said water flowing downwardly in the column,
   (b) heating the bottom of the column electrically or by steam to a temperature of 95–110° C.,
   (c) feeding aqueous sodium cyanide solution of a pH of from 4–6 into the middle portion of the column in an amount up to 40% excess,
   (d) feeding gaseous chlorine into the bottom of the column,
   (e) adjusting and then uniformly maintaining the rate of feed of the sodium cyanide solution to obtain a 0.1–1% excess of hydrogen cyanide in the overhead gas, and
   (f) recovering cyanogen chloride without detectable chlorine from the top of said column; the temperature in said column decreasing from 95–110° C. at the bottom to 13–25° C. at the top.

4. A method as claimed in claim 1 wherein said hydrogen cyanide or acidified alkali cyanide solution is used in an amount of from 5 to 12% in excess over that stoichiometrically required.

5. A method as claimed in claim 1 wherein said one-column closed system is a flooded packed column or a sparged gas reactor.

References Cited
UNITED STATES PATENTS

| | | | |
|---|---|---|---|
| 3,197,273 | 7/1965 | Trickey | 23—359 |
| 1,588,731 | 6/1926 | Heuser | 23—359 |

MILTON WEISSMAN, Primary Examiner

U.S. Cl. X.R.

260—248